Patented Sept. 13, 1938

2,129,685

UNITED STATES PATENT OFFICE 2,129,685

ESTERS OF METHACRYLIC ACID

George D. Graves, Wilmington, Del., assignor to E. I. du Pont de Nemours & Company, Wilmington, Del., a corporation of Delaware No Drawing. Application July 14, 1934, Serial No. 735,281

6 Claims. (Cl. 260—2)

The present invention relates to new compositions of matter, to methods for their preparation and more particularly to the methacrylic acid esters of the phenols and more specifically phenyl methacrylate, ortho cresyl methacrylate and resorcinyl methacrylates.

An object of the present invention is to provide new compositions of matter and a process for their preparation. A further object of the invention is to provide a new polymerizable composition of matter together with a process for its polymerization. A still further object of the invention is to provide a process for the preparation of the methacrylic acid esters of the phenols, which may be obtained by the ester interchange method of interacting a lower alkyl ester of methacrylic acid with the alcohol in the presence of a suitable catalyst, or by the reaction of the alcohol with a methacrylyl halide. Another object of the invention is to provide mixtures or interpolymers of the polymerized resin with other polymerizable compounds of methacrylic and acrylic acids. Other objects and advantages of the invention will hereinafter appear.

There have been prepared in accord with this invention valuable esters of methacrylic acid which have been found useful as prepared and even more valuable when polymerized. These compounds may be generally described as methacrylic acid esters of the phenols such, for example, as phenyl methacrylate, orthocresyl methacrylate, resorcinyl methacrylate, paracyclohexyl phenyl methacrylate, beta-naphthyl methacrylate, alpha naphthyl methacrylate, hydroquinyl methacrylates and equivalent and homologous methacrylates, the mono- and poly-methacrylates of the mono- and polyhydric phenols such as resorcinol, catechol, pyrogallol, phloro-glucinol, the di- or polyhydroxy naphthols and naphthalenes; thymol, diphenylol propane; diphenylol naphthane, and the like.

The following specific examples are furnished to illustrate methods of preparing the new compositions of matter, but it will be understood that the invention is not limited to the details herein given.

Example 1.—Equimolar quantities of methacrylyl chloride and orthocresol were mixed and the solution was warmed on a water bath under a reflux condenser at such a rate that hydrogen chloride was liberated vigorously. After the vigorous liberation of hydrogen chloride had ceased (usually after the solution had been heated on the boiling water bath for about one-half hour) there was added 10 parts of hydroquinone to each 100 parts of methacrylyl chloride used originally and heating on the boiling water bath was continued about 20 minutes longer.

After cooling, the reaction mixture was dissolved in ether, and extracted with water and then with 5% sodium hydroxide solution until free from hydrochloric acid, inhibitor and unreacted orthocresol. The cold reaction mixture was neutralized and then washed and dried over a suitable desiccating medium. The solvents were removed from the dried product by fractional distillation, and the ester finally separated by fractionation under reduced pressure. A 70% yield of orthocresyl methacrylate was obtained, which had a boiling point between 98–103° C., at 5 mm., a density of 1.031 at 20° C., and a saponification number of 324 (theoretical 318).

Example 2.—The process of Example 1 was repeated with 188 parts (all parts are by weight) of phenol, and 208 parts of methacrylyl chloride. The temperature of the reaction varied from 25° C. to 100° C., and after 1 hour a 70% yield of phenyl methacrylate was obtained. The ester had a boiling point of 83–84° C., at 4 mm., a density of 20° C., of 1.053 and a saponification number of 339 (theoretical 346).

Example 3.—The process of Example 1 was repeated with 127 parts of paracyclohexyl phenol and 80 parts of methacrylyl chloride. The temperature was maintained between approximately 90–95° C., and after 50 minutes a 74% yield of paracyclohexyl phenol methacrylate was obtained. The ester had a melting point of 67–68° C., a saponification number of 242.8 (theoretical 230) and was soluble in hot ether, hot methanol, and benzene.

Example 4.—104 parts of methacrylyl chloride and 55 parts of resorcinol were mixed and the solution was warmed on a water bath under a reflux condenser at such a rate that hydrogen chloride was liberated vigorously. After the vigorous liberation of hydrogen chloride had ceased (usually after the solution had been heated on the boiling water bath for about one-half hour) there was added 10 grams of hydroquinone to each 100 grams of methacrylyl chloride used originally and heating on the boiling water bath was continued about 20 minutees longer.

After cooling, the reaction mixture was dissolved in ether, and extracted with water and then with 5% sodium hydroxide solution until free from hydrochloric acid, inhibitor and unreacted resorcinol. The cold reaction mixture was dried over a suitable desiccating medium, the solvents removed by fractional distillation and the resulting mixture fractionated under reduced pressure. A 65% yield of resorcinyl dimethacrylate was obtained.

The methacrylates as prepared in accord with the examples are usually mobile liquids, but may sometimes be solids. The esters as thus produced are monomeric and may be polymerized, according to the invention, by means of heat, light, and/or a catalyst, e. g., as described for the polymerization of organic vinyl esters in British specification 15271/1914. Preferably a catalyst such as oxygen, ozone, an organic peroxide, an ozonide, etc. is employed. Other catalysts which may be used include aluminum sulfate, boron fluoride, the mineral acids, e. g., hydrochloric, sulfuric acids, as well as the organic acids and more particularly acetic and methacrylic acids, etc., as well as the anhydrides and acid halides of such acids; metal salts of fatty acids and resinic acids, e. g., cobalt linoleate and resinate, manganese oleate and rosin, etc. The polymerization may be effected in the presence or absence of a solvent for both monomer and polymer, or in the presence of a solvent for the monomer and a non-solvent for the polymer, or the monomer may be emulsified and then polymerized. Preferably, polymerization is carried out at a moderate temperature, i. e., between 60–100° C., altho higher temperatures, such as, for example, 130° C., or higher, may be employed. The polymerization reaction is usually strongly exothermic and it may be necessary to control the temperature by cooling devices, though polymerization may be carried out in apparatus which may or may not be provided with condensing devices, or in suitable pressure equipment.

As indicated various methods may be employed for polymerizing the monomeric esters of methacrylic acid and it has been found that the properties of the resins, the physical properties to a large extent and the chemical properties to a lesser extent, are altered considerably by the type of polymerizing process utilized. The process described in the copending applications of D. E. Strain Serial No. 668,080 filed April 26, 1933 and 704,753 filed Dec. 30, 1933 may be used if desired.

Methods illustrating the polymerization of the esters will now be described but it will be understood that other suitable polymerizing processes may be employed.

*Example 5.*—40 parts (parts are given by weight) of orthocresyl methacrylate monomer was dissolved in 310 parts of methanol in a bottle provided with a stopper, then 0.4 part of powdered benzoyl peroxide added to this solution. After the benzoyl peroxide was all dissolved, 50 parts of water insufficient to cause permanent turbidity was added. The bottle was securely closed and set in an oven at approximately 65° C. After the polymerization was complete in approximately 3 days, the mixture was allowed to cool. The product was filtered, washed with a little cold methanol and dried in a vacuum desiccator. The polymer was obtained as a white powder, in a 92% yield. It is soluble in toluene and relatively insoluble in butyl acetate, acetone and gasoline. A 5% solution in toluene has a viscosity at 25° C., of 0.04 poise.

The resin was placed in a disk shaped mold in which it was subject to a temperature of 150° C., and a pressure of approximately 5000 pounds per square inch for approximately 15 minutes. A water white, brittle, molded disk was obtained which softened at a temperature of 106° C.

*Example 6.*—100 parts of phenyl methacrylate monomer 400 parts of acetone and 1 part of benzoyl peroxide were mixed and the solution heated under a reflux condenser at a temperature of approximately 75° C. After 4 days the polymerization was substantially complete. The resin was isolated by mixing with gasoline (any suitable non-solvent for the resin may be used). A 98% yield of the polymer as a coarse powder was obtained. It is soluble in butyl acetate, acetone and toluene and relatively insoluble in gasoline. It has a viscosity of 0.015 poise (5% solution in toluene at 25° C.).

The resin was placed in a disk shaped mold in which it was subjected to a temperature of 130° C., and a pressure of approximately 4000 pounds per square inch for approximately 15 minutes. A brittle, molded disk was obtained which softened at a temperature of 120° C.

*Example 7.*—40 parts of paracyclohexyl phenyl methacrylate monomer was dissolved in 360 parts of methanol in a bottle provided with a stopper, then 0.4 part of powdered benzoyl peroxide added to this solution. The bottle was securely closed and set in an oven at approximately 65° C. After the polymerization was complete in approximately 3 days, the mixture was allowed to cool. The product was filtered, washed with a little cold methanol and dried in a vacuum desiccator. The polymer was obtained in a 95% yield as a white powder which gave a turbid solution in toluene. It is relatively insoluble in butyl acetate, acetone and gasoline. A 5% turbid solution in toluene gave a viscosity at 25° C., of 1.25 poises.

The resin was placed in a disk shaped mold in which it was subjected to a temperature of 160° C., and a pressure of approximately 6000 pounds per square inch for approximately 15 minutes. A brittle, very hard, slightly hazy, molded disk was obtained which softened at a temperature of 145° C.

*Example 8.*—Resorcinyl dimethacrylate polymerizes readily without the aid of a catalyst and at a temperature of 100° C., the monomer is converted 100% to the polymer which is a amber-colored, flint like, brittle material which burns without softening. It is relatively insoluble in common organic solvents.

Valuable products may be obtained by utilizing the polymers of the esters described herein together with equivalents or homologues thereof admixed with other polymeric acrylic or methacrylic esters or other derivatives. Especially valuable products result if the monomeric esters are mixed and then polymerized, by this method interpolymers having a wide range of characteristics are made. Due to the unique characteristics of methyl methacrylate polymer which is a hard resin having a high melting point, its admixture with the polymeric esters of methacrylic acids herein described or interpolymers thereof are particularly well adapted for many uses.

The polymerized esters of methacrylic acid as well as mixtures or interpolymers thereof with other polymerizable compounds are particularly well suited for thermoplastic molding. The monomer may be polymerized and/or preformed prior to placing in the mold and then may be molded in accord with the usual procedural steps employed particularly in the molding of methyl methacrylate as described in the Rowland Hill Patent 1,980,483 of November 13, 1934. The mold preferably is hot, prior to the introduction of the polymerization product, is then closed and the material so confined heated and pressed, the temperatures ranging from approximately 80–150° C., and pressures from 200 pounds per square inch, upward, are usually sufficient to give a suitably molded product. The presence or absence of plasticizers will, of course, alter considerably the molding conditions and it is usually advantageous to have present plasticizers to alter the physical characteristics of the resulting product to fit the particular need for which the molded article is to be used.

The masses resulting from polymerization can immediately (i. e., in the state they have been obtained) be made into useful articles. It is possible to obtain the required articles if, for instance, the polymerization be carried out while the initial material is in a suitable mold, for instance one of steel or glass, so that the articles, for example, umbrella handles, fountain pen barrels, buttons and the like, are obtained directly from the mold. Or if desired the masses may be worked to the required shape by softening with suitable softeners or plasticizers in the presence of volatile solvents and, after shaping, evaporating the solvent.

The polymerization products may be worked into the required shapes in various ways, for example, they can be softened and kneaded, rolled, compressed, drawn into wires, threads or the like, or the masses can be mixed with additional substance, and rolled into plates, or films, or they may be pressed into the required shapes such as buttons, combs and the like.

The solid masses can be worked by cutting, sawing, filing, or the like, whether they be obtained directly by polymerization, or after special treatment of the polymerized masses. These shaped articles may be polished, and parts connected together by smearing the faces to be connected with a suitable solvent, such as acetone, epichlorhydrin, or the corresponding methacrylic acid ester.

The polymerization product dissolved in a suitable solvent which may or may not be the monomer may be transformed into a useful article, e. g., films by casting and then evaporating the solvent, or by extruding through a suitable orifice into a precipitating bath or drying atmosphere. The polymer may be recovered from such solutions by precipitation with a suitable non-solvent for the polymer.

The properties of the resulting masses may be widely varied by modification with plasticizers, e. g., dibutyl phthalate, tricresyl phosphate, etc., drying, semi-drying and non-drying oils, synthetic and natural resins, waxes, bitumens, cellulose derivatives, e. g., cellulose nitrate and ethyl cellulose, etc., pigments, fillers, and dyes, etc. Thus it is possible to produce instead of hard, glasslike masses, also soft and flexible masses. Likewise, by the addition of suitable coloring means, it is possible to produce masses, or objects, having any desired color effects. The incorporation of the additions can be effected either before, or during, the polymerizing process, or the additions can be made to the already formed polymerization products in a suitable condition.

If the polymerization of an organic methacrylic acid ester, be carried out in an incomplete manner, a syrupy solution of the polymerization product containing some unchanged methacrylic acid ester is obtained. This product can be utilized either directly, or along with other solvents, or diluents, for the production of substances to be used for coating, painting, or impregnating purposes. If, for instance, a porous substance such as wood, paper, textile fabric, artificial stone, or the like be coated with the said syrupy solution or be impregnated therewith, very resistant coating and impregnations are obtained on completing the polymerization of the coating, painting, or impregnation, for instance, by exposing the article to artificial or natural light or by heating it, or by employing both light and heat. In this case a portion of the unchanged methacrylic acid ester in the syrupy solution may or may not be evaporated while another portion may be converted into the solid polymerization product. The articles thus treated have imparted to them a very high resistance to external influences, e. g., resistance to water, acids, alkalis and atmospheric changes.

The said syrupy mass can be mixed with comminuted matter, such, for instance, as ground cork, or ground wood, fibrous substances, mineral fillers, or the like and the mixture be made into the proper shape and the unchanged methacrylic acid esters in the articles be converted, by suitable polymerization, into the solid final product.

It is also possible to start from solid, semisolid, or plastic, polymerization products of the methacrylic acid esters, these being softened by heating them by themselves, or with suitable solvents, and using them in their softened state. On cooling, or on the evaporation of the diluent, that may still be present, the product is converted into the solid, lacquer-form.

It is obvious that mixtures of various polymerized methacrylic acid esters can be used for lacquering, painting, or impregnating in accordance with this invention. It is likewise obvious that the wholly, or partly polymerized esters can be mixed with suitable additional substances to modify the properties of the lacquering, painting, or impregnating materials in any desired manner. As additions of this kind oils should be mentioned (such, for instance, as castor oil), dyes, powdered substances, (such as zinc oxide) camphor, camphor substitutes, and the like.

In accordance with this invention it is possible to obtain valuable products if the said polymers be dissolved, or softened, in suitable solvents and then be converted again to the solid state. The products thus obtained may be used for purposes for which cellulose esters have hitherto been used, namely as substitutes for horn, amber, artificial resins, lacquers, for impregnation purposes and also for the production of films, interlayer for safety glass, pressure adhesives, artificial threads, and the like.

The products thus formed have the advantage over products made from nitrocellulose in being less inflammable. By the addition of suitable agents, the strength and hardness of the products may be modified within wide limits so that it is possible to manufacture, both hard, horn-like substances and soft and more pliable products. The products may also be modified by varying the conditions of the polymerization.

The monomer may be polymerized in the presence of a solvent and the solution used as such or the polymer recovered from the solution by evaporation or precipitation methods. In many cases, however, it is more profitable to use an amount of solvent insufficient to produce a freely flowing solution, so that soft plastic masses are obtained which can be pressed, kneaded, rolled or drawn into shape, or formed into blocks, plates, or films.

Plasticizers or other modifying agents may be added to the monomer prior to polymerization or directly to the polymerized product, it being generally desirable to employ a plasticizer which is soluble in the polymer and the monomer, altho it is not essential that the dual solubility characteristics be present. Thus, plasticizers or softening agents, such as for example, camphor; phthalates, such as ethyl, propyl, isopropyl, butyl, isobutyl, cyclohexyl, methyl cyclohexyl, or benzyl phthalate or phthalates of the mixed type such as cyclohexyl butyl, benzyl butyl or butyl lauryl phthalate; esters of other dibasic acids, such as the ethyl, propyl, isopropyl, butyl, isobutyl, cyclohexyl, methyl cyclohexyl or benzyl esters of succinic, fumaric, tartaric, adipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g., glycol and glycerol, such as glycol benzoate, glycol laevulinate, triacetin, tripropionin and tributyrin; substituted toluene sulphonamides, such as ethyl paratoluene sulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and drying, non-drying or semi-drying oils, such as castor oil, cotton seed oil, linseed oil and the like. These additions also facilitate later mechanical treatment, as cutting, sawing, and polishing.

The polymerized esters, mixtures of the polymerized esters with dissimilar polymerizable esters or other polymerizable compounds of methacrylic or acrylic acids, or vinyl compounds; or interpolymers of the esters with such other compounds, may be used advantageously as safety glass interlayers. These polymerized esters, mixtures thereof, or interpolymers thereof may be plasticized or otherwise modified as desired. The compositions may be compounded with glass in an unpolymerized, partially polymerized, or completely polymerized condition. When compounding the safety glass with the unpolymerized or partially polymerized compositions, the polymerization may be effected by subjecting the sandwich of glass and compound to suitable application of light and/or heat.

When the term "poly" is employed in the specification or in the claims it refers only to the number of methacrylate groups attached to the designated alcohol, in contradistinction to the "polymerized" ester which is the union of two or more molecules of the ester.

From a consideration of the above specification it will be realized that various changes may be made in the process or product without departing from the invention or sacrificing any of its advantages.

I claim:

1. The polymeric methacrylic acid ester of a phenol prepared by polymerizing the monomeric ester by heating to a temperature of approximately 65° C. in the presence of benzoyl peroxide.

2. The polymeric phenyl methacrylate prepared by polymerizing the monomeric ester by heating to a temperature of approximately 65° C. in the presence of benzoyl peroxide.

3. The polymeric paracyclohexyl phenyl methacrylate prepared by polymerizing the monomeric ester by heating to a temperature of approximately 65° C. in the presence of benzoyl peroxide.

4. The polymeric resorcinol dimethacrylate prepared by polymerizing the monomeric ester by heating to a temperature of approximately 65° C. in the presence of benzoyl peroxide.

5. The polymeric polymethacrylate of a phenol prepared by polymerizing the monomeric ester by heating to a temperature of approximately 65° C. in the presence of benzoyl peroxide.

6. The interpolymer of a methacrylic acid ester of a phenol and a polymerizable derivative of an acid selected from the group consisting of acrylic acid and methacrylic acid, which interpolymer is prepared by polymerizing a mixture of the monomeric compounds by heating the mixture to a temperature of approximately 65° C. in the presence of benzoyl peroxide.

GEORGE D. GRAVES.